US012574065B2

(12) United States Patent (10) Patent No.: US 12,574,065 B2
Rodriguez et al. (45) Date of Patent: Mar. 10, 2026

(54) HIGH FREQUENCY TRANSPONDER

(71) Applicant: The Government of the United States of America, as represented by the Secretary of the Navy, Arlington, VA (US)

(72) Inventors: Serafin Rodriguez, Washington, DC (US); John McConnell, Washington, DC (US); John Glancy, Washington, DC (US); William Lee, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 343 days.

(21) Appl. No.: 18/374,990

(22) Filed: Sep. 29, 2023

(65) Prior Publication Data

US 2025/0112664 A1 Apr. 3, 2025

(51) Int. Cl.
*H04B 1/10* (2006.01)
*H04B 1/401* (2015.01)
*H04B 1/403* (2015.01)
(52) U.S. Cl.
CPC ............. *H04B 1/406* (2013.01); *H04B 1/401* (2013.01)

(58) Field of Classification Search
CPC ................................ H04B 1/406; H04B 1/401
USPC ....................................................... 455/552.1
See application file for complete search history.

(56) References Cited

U.S. PATENT DOCUMENTS

| | | | | |
|---|---|---|---|---|
| 7,177,662 | B2 * | 2/2007 | Trachewsky | ........... H04B 1/406 |
| | | | | 455/313 |
| 12,177,169 | B2 * | 12/2024 | Yuan | ................... H04L 25/0212 |
| 2020/0124705 | A1 * | 4/2020 | Buonocore | ......... G01S 13/0209 |
| 2023/0336196 | A1 * | 10/2023 | Deforge | ................... H04B 1/04 |

* cited by examiner

*Primary Examiner* — Tanmay K Shah
(74) *Attorney, Agent, or Firm* — US Naval Research Laboratory; William P. Ladd

(57) ABSTRACT

Systems and methods are provided for a transponder with several capabilities that are not present in conventional transponders. For example, an exemplary transponder in accordance with an embodiment of the present disclosure can be configured for two-way trans ponding, waveform generation, receiving, and antenna S11 measurement. In an embodiment, a transponder in accordance with an embodiment of the present disclosure can support multiple operating modes simultaneously. For example, a transponder in accordance with an embodiment of the present disclosure can interleave transponding, direct digital receiver, and waveform generation modes according to an order of precedence.

20 Claims, 10 Drawing Sheets

FIG. 4

HIGH FREQUENCY TRANSPONDER

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 103976-US1.

FIELD OF THE DISCLOSURE

This disclosure relates to communication systems, including transponders.

BACKGROUND

Transponders are devices that can receive signals and can emit different signals in response to the received signal. For example, a transponder can respond to a signal in such a manner that a separate receiver can identify a unique embedded response from the transponder. Conventional transponders have several limitations, including high cost and limited capability/functionality, and are not well matched for specific radar/hardware requirements. Embodiments of the present disclosure provide systems and methods for a transponder that addresses limitations of conventional transponders.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings:

FIG. 4 is a diagram of another exemplary main GUI in accordance with an embodiment of the present disclosure;

Figure 1:
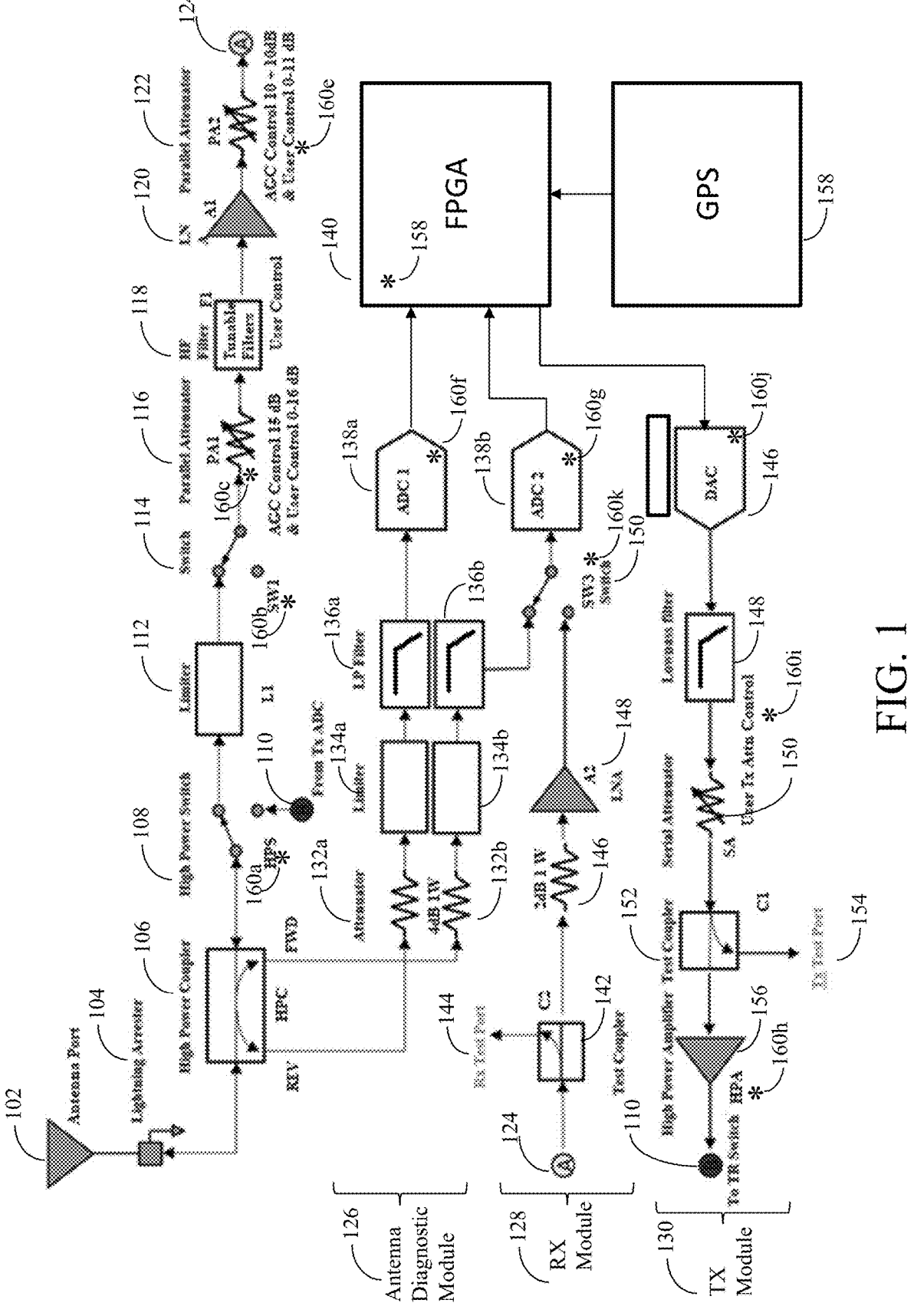
FIG. 1 is a block diagram of a transponder in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for a transponder with several capabilities that are not present in conventional transponders. For example, an exemplary transponder in accordance with an embodiment of the present disclosure can be configured for two-way transponding, waveform generation, receiving, and antenna S11 measurement.

2. Exemplary Transponder

FIG. 1 is a block diagram of a transponder in accordance with an embodiment of the present disclosure. The transponder of FIG. 1 is configured for transponding, transmitting, and receiving signals, such as high frequency (HF) signals. The transponder of FIG. 1 provides capability for two-way transponding, one-way ionospheric sounding (transmitting (TX) and receiving (RX)), and one-way radar beacon channel scattering measurements (TX and RX). In an embodiment, the transponder of FIG. 1 contains built-in diagnostics for the attached antenna S11 (e.g., the reflection coefficient-a measurement of how much power is reflected from an antenna) and a built-in 25 W amp (typical output levels<20 W beacon, <1 W transponding).

In FIG. 1, antenna 102 is coupled to a lightning arrester 104 that can provide radio frequency (RF) surge protection. In FIG. 1, lightning arrester 104 is coupled to high power coupler 106 for forward and reverse power sensing, which is coupled to high power switch 108, which enables switching between transmitting and receiving. While high power coupler 106 is shown as a high power coupler in FIG. 1, it should be noted that a variety of types of couplers can be used in accordance with embodiments of the present disclosure. In FIG. 1, high power coupler 106 also couples to antenna diagnostic module 126, which is coupled to field-programmable gate array (FPGA) 140. In FIG. 1, receive (RX) module 128 and Global Positioning System (GPS) 158 are also coupled to FPGA 140, and FPGA 140 generates an output to transmit (TX) module 130 at connection 110. In FIG. 1, high power switch 108 is configured to connect high power coupler 106 to either a limiter 112 or connection 110. While high power switch 108 is shown as a high power switch in FIG. 1, it should be noted that a variety types of switches can be used in accordance with embodiments of the present disclosure.

In FIG. 1, limiter 112 is an optional component that can provide additional surge limiting and can protect against glitching signals from high power switch 108. In FIG. 1, limiter is coupled to switch 114, which is a low power switch that helps to mitigate glitching from high power switch 108. Switch 114 couples to ground to dump when it detects energy above a predetermined threshold set by FPGA 140. In an embodiment, a user can change the predetermined threshold for dumping. Switch 114 also couples to parallel attenuator (PA) PA1 116, which attenuates signal level. For example, if the environment is louder at night, either a user or the system needs to be able to protect analog to digital converters (ADCs). In an embodiment, PA 1 116, low noise amplifier (LNA) A1 120, PA2 122, and LNA A2 148 can work in tandem to attenuate the signal, boost signal level again, attenuate, and boost it to reduce internal noise seen by the system. In an embodiment FPGA control signals can control up to 0.5 db values. In FIG. 1, PA1 is coupled to high frequency (HF) filter 118, which is a tunable filter with a band determined by FPGA 140. In FIG. 1, HF filter 118 is coupled to A1 120, which is coupled to PA2, which can be set to a different value than PA1 116 if needed, and can provide automatic gain control (AGC) of 10+10 db and user control of 0-11 dB. In FIG. 1, PA2 is coupled to connection 124, which is an input of receive module 128.

In FIG. 1, high power coupler 106 couples to inputs of antenna diagnostic module 126 at attenuators 132a and 132b. In FIG. 1, attenuators 132a and 132b couple respectively to limiters 134a and 134b, which couple respectively to low pass filters (LPFs) 136a and 136b. In an embodiment, attenuators 132 are fixed attenuators, and attenuators 132, limiters 134, and LPFs 136 are based on antenna characteristics of antenna 102. In FIG. 1, LPF 136a couples to ADC1 138a, which generates a digital input for FPGA 140. In FIG. 1, LPF 136b couples to switch 150 in RX module 128, which will be discussed later below.

In FIG. 1, RX module 128 receives an input from connection 124, as discussed above, which optionally couples PA2 122 to test coupler 142. In an embodiment, test coupler 142 is a diagnostics coupler that allows for observing what FPGA 140 will "see" and connects to a test port 144. In FIG. 1, test coupler 142 couples to attenuator 146 (e.g., a fixed 2 dB 1 W attenuator), which couples to A2 148. In FIG. 1, A2 148 couples to switch 150, which is configured to couple either A2 148 or LPF 136b to ADC 2 138b, which is configured to generate a digital input for FPGA 140. For example, switch 150 can switch an input for FPGA 140 between antenna diagnostics module 126 or RX module 128 based on a signal from FPGA 140 depending on the mode of the system (e.g., either diagnostic (DX) or receive (RX) mode).

In FIG. 1, TX module 130 is configured to transmit an output signal from FPGA 140. For example, FPGA 140 generates an output to digital to analog converter (DAC) 146, which generates an analog signal and transmits it to LPF 148. In FIG. 1, LPF 148 is coupled to serial attenuator (SA) 150, which can be adjusted by a user. In FIG. 1, SA 150 is coupled to optional test coupler 152, which is coupled to test port 154 (e.g., for system diagnostics) and high power amplifier (HPA) 156. In FIG. 1, HPA 156 couples to connection 110, which is one of the inputs for high power switch 108, as discussed above.

In FIG. 1, FPGA is configured to communicate 158 (e.g., over wired or wireless connections) with elements in FIG. 1 (e.g., to send control signals). For example, in FIG. 1, FPGA 140 is configured to communicate 158 with high power switch 108 (e.g., to control switching of high power switch 108), switch 114 (e.g., to control switching of switch 114), switch 150 (e.g., to control switching of switch 150) PA1 116 (e.g., to control an amount of attenuation), HF filter 118 (e.g., to tune HF filter 118), PA2 122 (e.g., to control an amount of attenuation), ADC1 138a, ADC2 138b, HPA 156, SA 150 (e.g., to control an amount of attenuation), and DAC 146. In FIG. 1, these communication connections are labeled with stars 160. For example, in an embodiment, FPGA 140 can be configured to generate control signal based on user settings adjustable by a user and/or predetermined settings based on calculations performed by FPGA 140.

In an embodiment, transponding can be chopped or 100% duty cycle with appropriate antenna hardware. In an embodiment, the transponder of FIG. 1 enables wideswept, stepped, and narrowband (TX or RX) with GPS triggered accuracy. A transponder in accordance with an embodiment of the present disclosure can be configured to operate in a plurality of modes, including an antenna S11 mode, a transponding mode (e.g., chopped and 100% duty cycle), a waveform generation mode, and a direct digital receiver mode. In an embodiment, S11 is a parameter describing an input-output relationship between ports representing how much power is reflected from the antenna. In an embodiment, switching between operating modes can be pre-scheduled with 3-5 seconds dead time between operations.

In an embodiment, high power switch 108 allows for toggling, based on a signal received from FPGA 140, between continuously receiving a signal or receiving a chopped signal (e.g., switching at a predetermined rate). In an embodiment, FPGA 140 is controlled through a graphical user interface (GUI) that allows access to 3 primary modes as well as antenna calibration of S11 (e.g., a diagnostic that looks at s11 of antenna 102 and calibrates loss and mismatch). In an embodiment, for antenna calibration (e.g., antenna diagnostics mode) high power switch 108 is instructed by FPGA 140 to be held in the transmit path (e.g., by coupling connection 110 to high power coupler 106). In an embodiment, the transponder of FIG. 1 includes secondary switches for the antenna diagnostics mode that route forward and reverse coupled powers to ADCs to take measurements for S11, and these measurements can be saved and displayed in plotform to provide diagnostic information.

In an embodiment, for transponding mode, high power switch 108 is instructed by FPGA 140 to alternate switching between transmitting and receiving (e.g., by switching the coupling of high power coupler 106 alternately between limiter 112 and connection 110) at a user-controlled rate (e.g., set via FPGA 140) between 1 Hz to 10 kHz).

In an embodiment, for waveform generation mode, high power switch 108 is instructed by FPGA 140 to switch to transmitting (e.g., by coupling connection 110 to high power coupler 106). In an embodiment, for direct digital receiver mode, high power switch 108 is instructed by FPGA 140 to switch to receiving (e.g., by coupling high power coupler 106 to limiter 112).

In an embodiment, when more than one mode is selected, there is an order of precedence as to which takes priority, and these modes can be configured to operate at less than 100% of the time leaving time for modes with less precedence (e.g., when higher precedence functions are not operating, lower precedence modes can operate). In an embodiment, the order of precedence can be configured by a user (e.g., using settings accessible via FPGA 140). In an embodiment, the order of precedence is waveform generation mode>direct digital receiver mode>transponding mode>antenna S11 mode. In an embodiment, a user can define a timeline regarding how to use resources (e.g., allocation of time to each function).

In an embodiment, the parallel attenuators and tunable filters enable both manual and automatic gain control. In an embodiment, at the hardware level, FPGA code monitors signals from ADCs 138, and if they are above a predetermined threshold (e.g., in an embodiment, software defined as 6 dB below full scale of ADC, but adjustable by an FPGA programmer), inserts additional attenuation on the RX path by adjusting attenuators such that signals won't clip. In an embodiment, AGC (auto gain control) logic in FPGA 140 has hysteresis so that if the signal levels drop by 1 second, FPGA 140 removes attenuation.

In an embodiment, manual gain control is enabled via the GUI or scheduled through configuration files accessible by FPGA 140. In an embodiment, FPGA 140 executes configuration files when instructed from GUI (e.g., by a user). For example, in an embodiment, a user can specify desired transponder peaks (e.g., specified amplitude, range offset, and Doppler offset for up to 6 peaks and for how long that transponding should occur, and a sequence of them can be put together and caused to repeat). In an embodiment, similarly there are configuration files for waveform generation that can specify sounding waveforms, radar waveforms (linear waveforms (e.g., chirp waveforms), coded waveforms, noise waveforms, and arbitrary waveforms based on user defined values). In an embodiment, for receive mode, there is a configuration file that enables collection of narrowband or wideband signals.

In an embodiment, the transponder of FIG. 1 is robust. For example, in an embodiment, the transponder of FIG. 1 enables a theoretical>10 W continuous input power with no damage, provides thermal shutdown based on a temperature of the high power amplifier (e.g., if it gets too hot), and enables prevention of damage to the high power amplifier if it is open or shorted for 1 second.

In an embodiment, the transponder of FIG. 1 supports 3-stage Automatic Gain Control to maintain operations with varying signal conditions with a 1 second 6 dB hysteresis and 35 dB (steps of 10, 10, 15 dB). In an embodiment, the transponder of FIG. 1 enables Manual Gain Control (e.g., 27 dB RX path, 1 dB steps and 31 dB TX path, 1 dB steps). In an embodiment, the receive filter of the transponder of FIG. 1 includes a tunable 5% filter, a Bandpass 3-35 MHz filter, and a 100 kHz digital filter. In an embodiment, the transponder of FIG. 1 enables logging on 1 second interval of mode and signal levels.

3. Exemplary Operating Modes

As discussed above, a transponder in accordance with an embodiment of the present disclosure can be configured to operate in a plurality of modes, including an antenna S11 mode, a transponding mode, a waveform generation mode, and a direct digital receiver mode. These modes will be discussed in turn below.

In an embodiment, a transponder in accordance with an embodiment of the present disclosure can support multiple operating modes simultaneously. For example, a transponder in accordance with an embodiment of the present disclosure can interleave transponding, direct digital receiver, and waveform generation modes according to an order of precedence. In an embodiment, the order of precedence is waveform generation mode>direct digital receiver mode>transponding mode>antenna S11 mode. In an embodiment, when a higher precedence task is received, FPGA 140 instructs the transponder to configure to the mode of the higher precedence task, and when the higher precedence task is completed, FPGA 140 instructs the transponder to continue with any lower precedence functions. In an embodiment, while lower precedence operations are not being sent, the chains for these lower precedence operations can still be operating but will not be transmit until FPGA 140 configures the transponder to support them.

3.1 Antenna S11 Mode

In an embodiment, the antenna S11 mode is an antenna diagnostic mode. In an embodiment, for antenna S11 mode, high power switch 108 is instructed by FPGA 140 to be held in the transmit path (e.g., by coupling connection 110 to high power coupler 106). In an embodiment, for antenna S11 mode, switch 150 is instructed by FPGA 140 to couple LPF 136*b* to ADC2 138*b*. In an embodiment, during antenna S11 mode, signals from antenna 102 pass to antenna diagnostics module 126 via high power coupler 106 and to FPGA 140 via switch 150.

In an embodiment, an exemplary antenna S11 mode enabled by the transponder of FIG. 1 provides a measurement of the power reflected from the antenna port utilizing a built-in coupler for receive and transmit paths. In an embodiment, the antenna S11 mode of the transponder of FIG. 1 can be used for voltage standing wave ratio (VSWR) measurement of an attached antenna element.

3.2 Transponding Mode

In an embodiment, for transponding mode, high power switch 108 is instructed by FPGA 140 to alternate switching between transmitting and receiving (e.g., by switching the coupling of high power coupler 106 alternately between limiter 112 and connection 110) at a user-controlled rate (e.g., set via FPGA 140) between 1 Hz to 10 kHz). In an embodiment, for transponding mode, switch 150 is instructed by FPGA 140 to couple A2 148 to ADC2 138*b*. In an embodiment, during transponding mode, while high power switch 108 couples high power coupler 106 to limiter 112, signals from antenna 102 pass to RX module 128 via high power switch 108, and RX module 128 passes these signals to FPGA 140 via the connection from switch 150 to ADC 2 138*b*. In an embodiment, during transponding mode, while high power switch 108 couples high power coupler 106 to connection 110, signals pass from FPGA 140, through TX module 130, and through connection 110 for transmission.

In an embodiment, for transponding mode, a user selects transponding mode (e.g., using a GUI accessible via FPGA 140), and, in an embodiment, doing this opens a new GUI to determine how the transponder will behave in transponding mode, and the result of these GUI configurations can be sent to FPGA 140. In an embodiment, FPGA 140 then adjusts attenuators (e.g., PA1 116, PA2 122, and or SA 150) based on user defined attenuation signals, sets HF filter 118 to a user specified center frequency or bypass mode, sends signals to high power switch 108 to start chop (e.g., switching back and forth at a user defined rate), starts receiving from ADC2 138*b*, looks at the output of ADC2 138*b* output to determine if AGC is needed, applies a 100 KHz digital filter in FPGA 140 if requested by the user, applies modulation requested by the user or via a configuration file, and sends a processed signal from FPGA 140 to TX module 130, where it goes through potential (e.g., user defined) transmit attention and output though the TX path when high power switch 108 is switched to transmit (e.g., when high power switch 108 couples connection 110 to high power coupler 106).

In an embodiment, an exemplary transponding mode enabled by the transponder of FIG. 1 supports 6 independent two-way modulated returns from the received radar signal at the transponder that show up as peaks in radar display (in an embodiment, up to 6 independent (e.g., software defined) peaks from radar. In an embodiment, these peaks are independently programmable by a user via a GUI (e.g., the user can specify a desired peak with a desired offset in range, a desired amplitude, and a desired velocity shift). In an embodiment, the transponder can respond with 6 modulated returns of radar signal that can compress to form peaks in the data. In an embodiment, a radar sends out signal, it's received via RX module 128, FPGA 140 modulates it to form up to six modified returns, these modified returns are passed from FPGA 140 to the transmit path, and FPGA 140 tells high power switch 108 to operate in TX mode.

In an embodiment, an exemplary transponding mode enabled by the transponder of FIG. 1 provides six independent peaks (e.g., with a range of 10-1250 nm (nautical miles) (2 way, expandable to longer range by software)). In an embodiment, the range is <1 nm when operating 100% duty cycle. In an embodiment, the 100% duty cycle is performed with 2 antennas (1 RX, 1 TX, so there is no need to chop (i.e., switch between RX and TX via high power switch)), thus enabling a shorter minimum range for peaks.

3.3 Waveform Generation Mode

In an embodiment, for waveform generation mode, high power switch 108 is instructed by FPGA 140 to switch to transmitting (e.g., by coupling connection 110 to high power coupler 106). In an embodiment, during waveform generation mode, signals pass from FPGA 140, through TX module 130, and through connection 110 for transmission.

In an embodiment, to put the transponder in waveform generation mode, a user selects waveform generation mode via main GUI, a sub-GUI pops up asking a user to specify aspects of waveform(s) to transmit on a schedule (e.g., allowing specification of which class of waveform is desired, when to trigger it, and how often to repeat that waveform, along with range, amplitude, and phase scaling factors). In an embodiment, a sub-GUI allows loading of configuration file(s) to allow sequencing between different classes of waveforms (e.g., GPS timed transmissions of a mix of different transponder supported waveforms). In an embodiment, a class of waveform supports selection of multiple amplitude weightings. In an embodiment, based on sub-GUI parameters, one waveform is uploaded to FPGA 140, and FPGA 140 follows a user defined repeat sequencing (e.g., continually transmitting waveform at a defined rate).

In an embodiment, FPGA 140 sends a signal to high power switch 108 to hold it in the transmit path and sets user defined analog attenuation.

In an embodiment, an exemplary waveform generation mode enabled by the transponder of FIG. 1 provides narrowband waveforms (e.g., LFM chirp with bandwidth and WRF), wideswept sounding (wideband chirp with frequency blanking), step sounding (programmed narrowband steps), coded, noise, and arbitrary waveforms. In an embodiment, waveforms are uploaded to FPGA 140 which executes their transmission based on user specifications as specified through the GUI or configuration file(s). For example, in an embodiment, a user determines waveforms and waveform classes (LFM-linear frequency modulation, wide sweep backscatter ionogram (swept oblique waveform), coded waveform, noise waveform, and arbitrary waveform) and specifies them within a configuration file that is uploaded to FPGA 140 with timing of generation of these waveforms.

In an embodiment, an exemplary waveform generation mode enabled by the transponder of FIG. 1 further provides a Doppler 0.02 Hz resolution (e.g., enabled by FPGA calculations for 6 peaks), digitally adjusted amplitude (e.g., enabled by FPGA calculations for 6 peaks), GPS triggering (e.g., enabled by FPGA calculations for 6 peaks), and a chop rate up to 10 khZ (e.g., degraded to 20 kHz, with a preference for <5 kHz). In an embodiment, a user defined rate via GUI suggests 3 chop rates that minimize eclipsing (e.g., minimizing period of desired transmit to achieve requested range that falls within RX time window) for a first peak and calculates eclipsing for up to 5 remaining peaks, and the eclipsing is displayed with recommended chop rates (e.g., to minimize eclipsing).

In an embodiment, an exemplary waveform generation mode enabled by the transponder of FIG. 1 provides a receive filter with analog 5% pre-filter, a bypass mode 3-35 MHz, auto gain control with hysteresis (e.g., 1 second), and an additional selectable 100 kHz digital narrowband receive filter (e.g., in FPGA 140). In an embodiment, a configuration file allows (up to) 6 peaks to be changed in the range of milliseconds up to 40 s.

3.4 Direct Digital Receiver Mode

In an embodiment, for direct digital receiver mode, high power switch 108 is instructed by FPGA 140 to switch to receiving (e.g., by coupling high power coupler 106 to limiter 112). In an embodiment, for direct digital receiver mode, switch 150 is instructed by FPGA 140 to couple A2 148 to ADC2 138*b*. In an embodiment, during direct digital receiver mode, signals from antenna 102 pass to RX module 128 via high power switch 108, and RX module 128 passes these signals to FPGA 140 via the connection from switch 150 to ADC 2 138*b*.

In an embodiment, to put the transponder in direct digital receive mode, a user selects direct digital receive mode via a GUI and parameters based on a sub-GUI, then, based on user-specified parameters, FPGA 140 instructs high power switch 108 to operate in RX mode (e.g., by connecting high power coupler 106 to limiter 112), sets user attenuators and tunable filters, looks at the output of ADC@ 138*b* to determine if any AGC is needed, and decimates and downconverts the requested bandwidth at the specified frequency.

In an embodiment, an exemplary digital receiver mode enabled by the transponder of FIG. 1 supports narrowband, wideband, and narrowband following a swept local oscillator (LO) bandwidths (e.g., when FPGA 140 downconverts, it uses a swept LO). In an embodiment, an exemplary direct digital receiver mode enabled by the transponder of FIG. 1 is GPS triggered and further provides GPS sequencing capability.

In an embodiment, an exemplary direct digital receiver mode enabled by the transponder of FIG. 1 enables (e.g., via FPGA 140 instructed by the user via a GUI) 2× Digital Down Conversion (DDC) Channels, narrowband collection (<200 kHz effective bandwidth), and swept and stepped linear frequency modulation (LFM) sounder waveform that supports oblique, auto oblique, and stepped sounder functions. In an embodiment, an exemplary direct digital receiver mode enabled by the transponder of FIG. 1 includes a variable 0-27 dB Rx user specified digital attenuation set at collection setup and includes 3-stage 35 dB (10 dB, 10 dB, 15 dB) Auto Gain Control Protection (e.g., with a 1 second 6 dB hysteresis).

4. Exemplary Systems

Figure 2A:
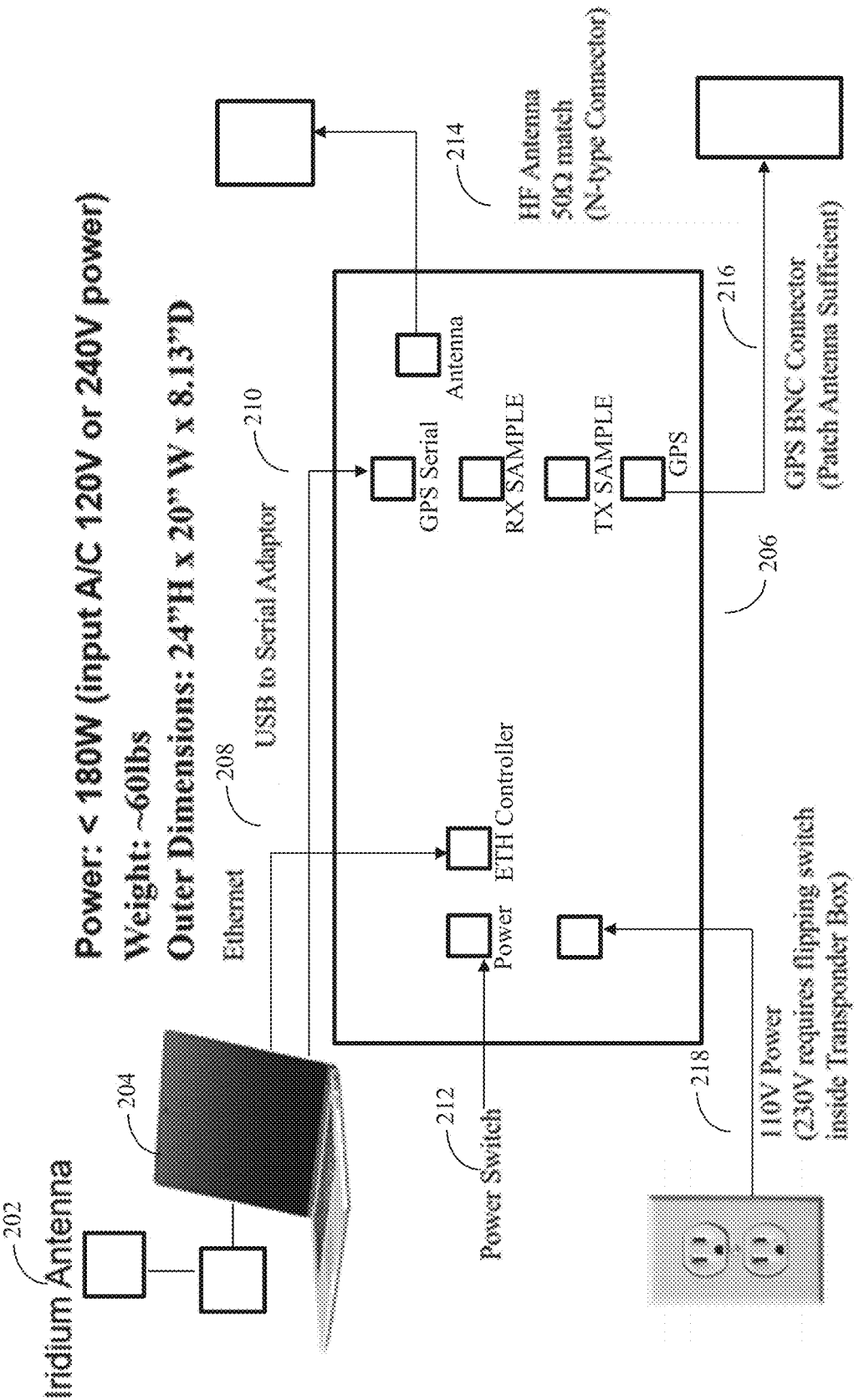
FIG. 2A is a diagram of an exemplary transponder system in accordance with an embodiment of the present disclosure.
Figure 2B:
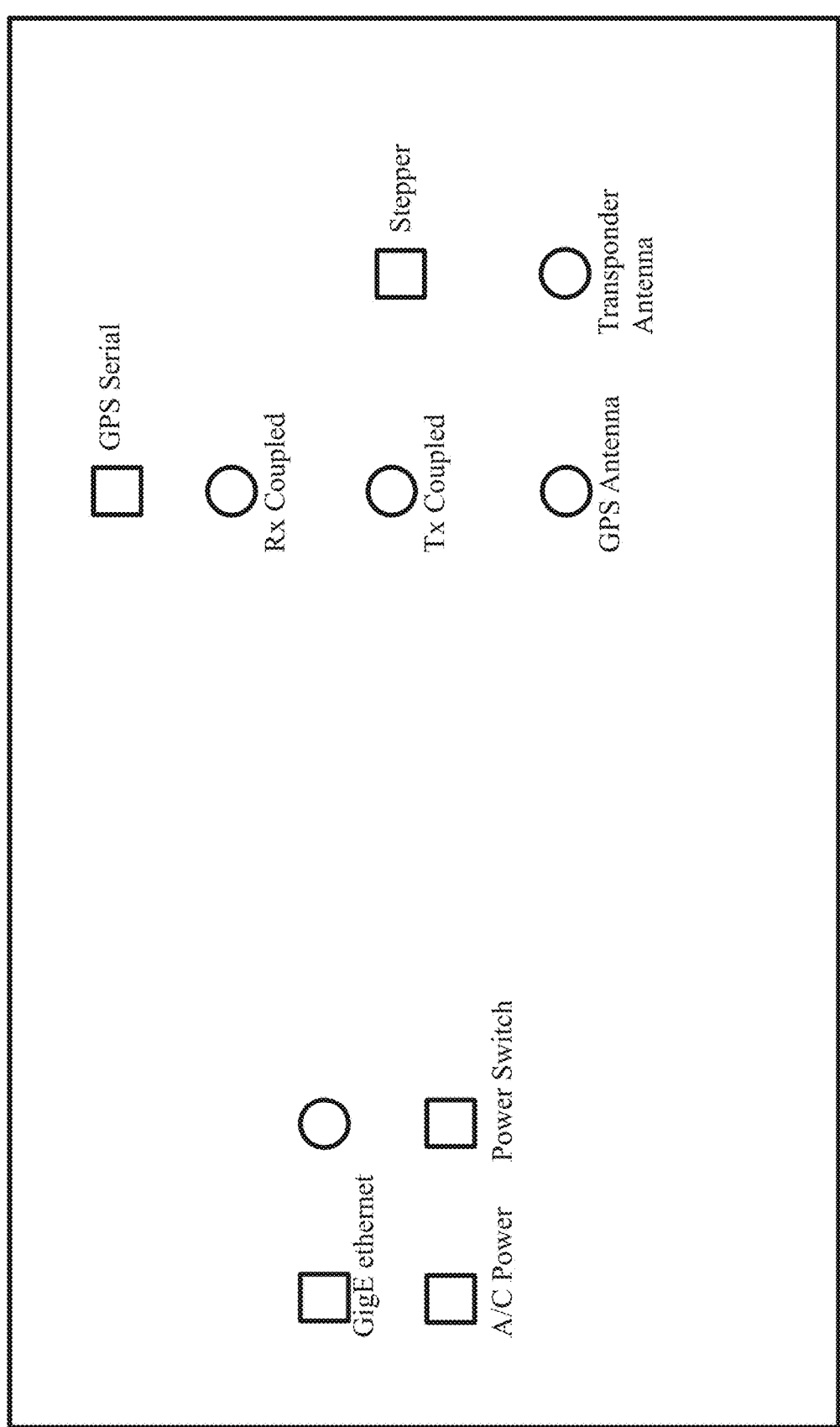
FIG. 2B is another diagram of an exemplary transponder system in accordance with an embodiment of the present disclosure.
Figure 2C:
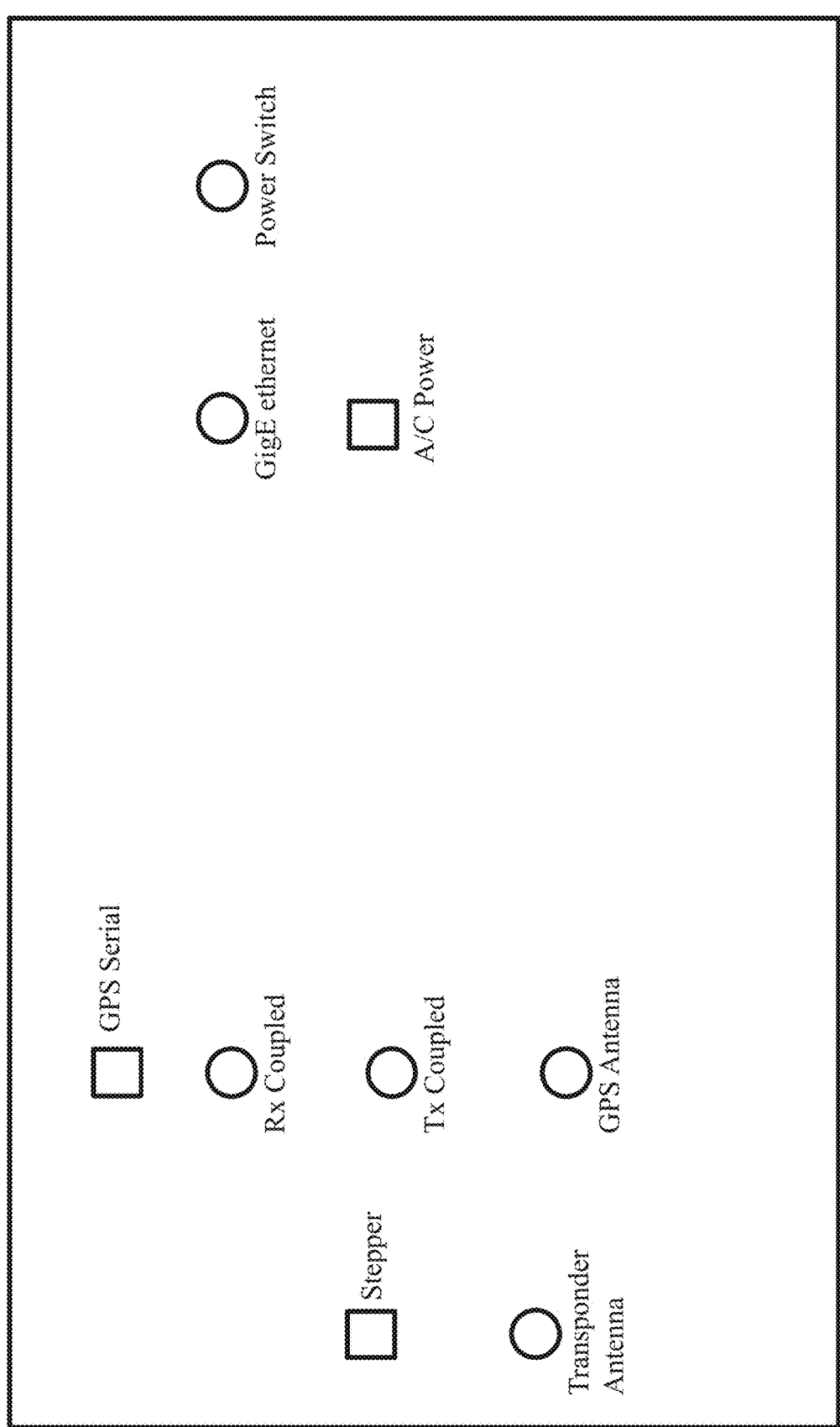
FIG. 2C is another diagram of an exemplary transponder system in accordance with an embodiment of the present disclosure.

FIG. 2A is a diagram of an exemplary transponder system in accordance with an embodiment of the present disclosure. In FIG. 2A, an antenna 202 (e.g., an iridium antenna) is coupled to a computer 204, which is coupled to a transponder 206 via an Ethernet connection 208 and/or a USB to serial adaptor 210. In FIG. 2A, transponder 206 also has a power switch 212, a connection 214 for a high frequency antenna, a GPS connector 216, and a socket 218 for a power cable. FIG. 2B is another diagram of an exemplary transponder system in accordance with an embodiment of the present disclosure. FIG. 2C is another diagram of an exemplary transponder system in accordance with an embodiment of the present disclosure.

Figure 3:
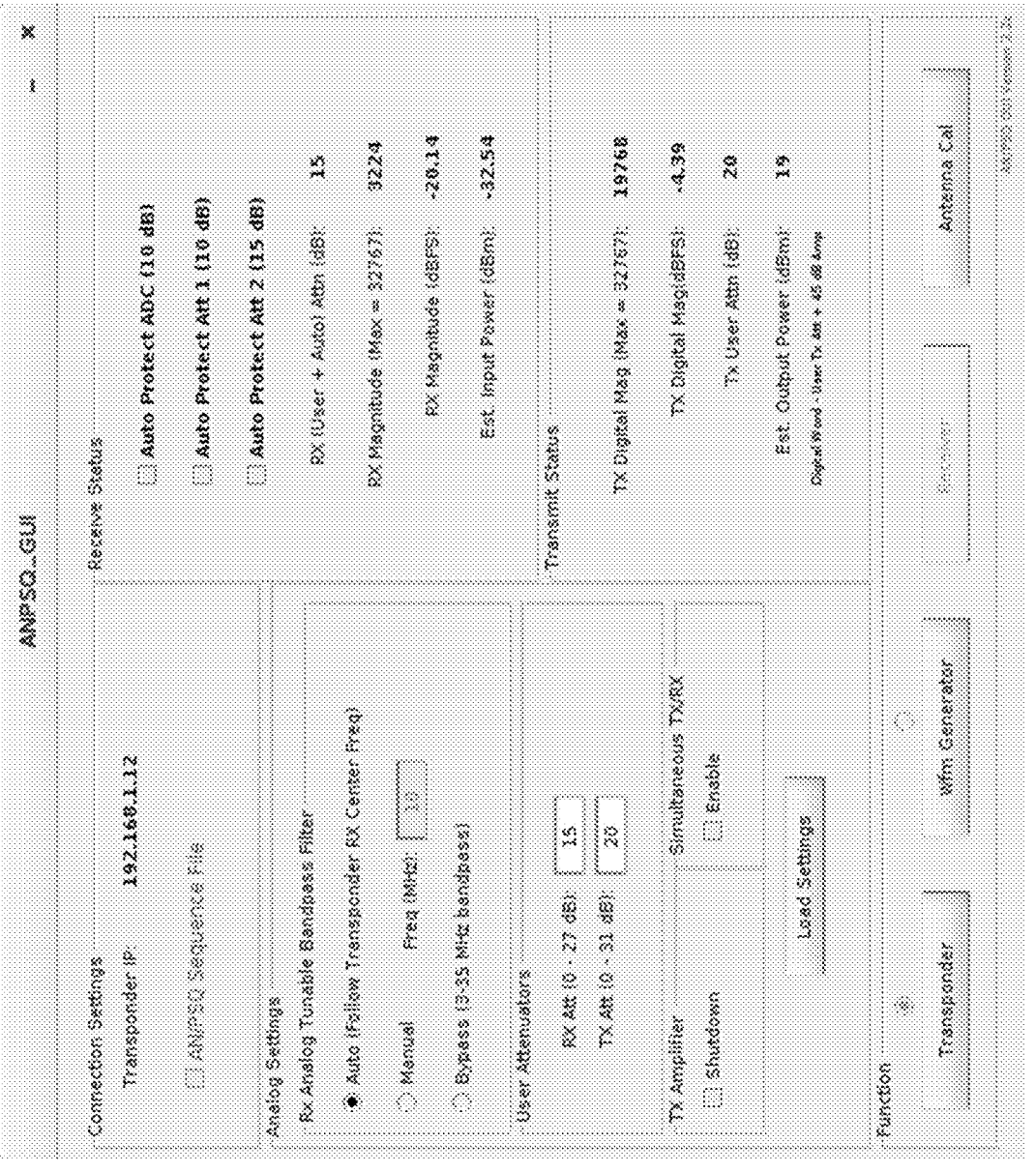
FIG. 3 is a diagram of an exemplary main graphical user interface (GUI) in accordance with an embodiment of the present disclosure.
Figure 4:
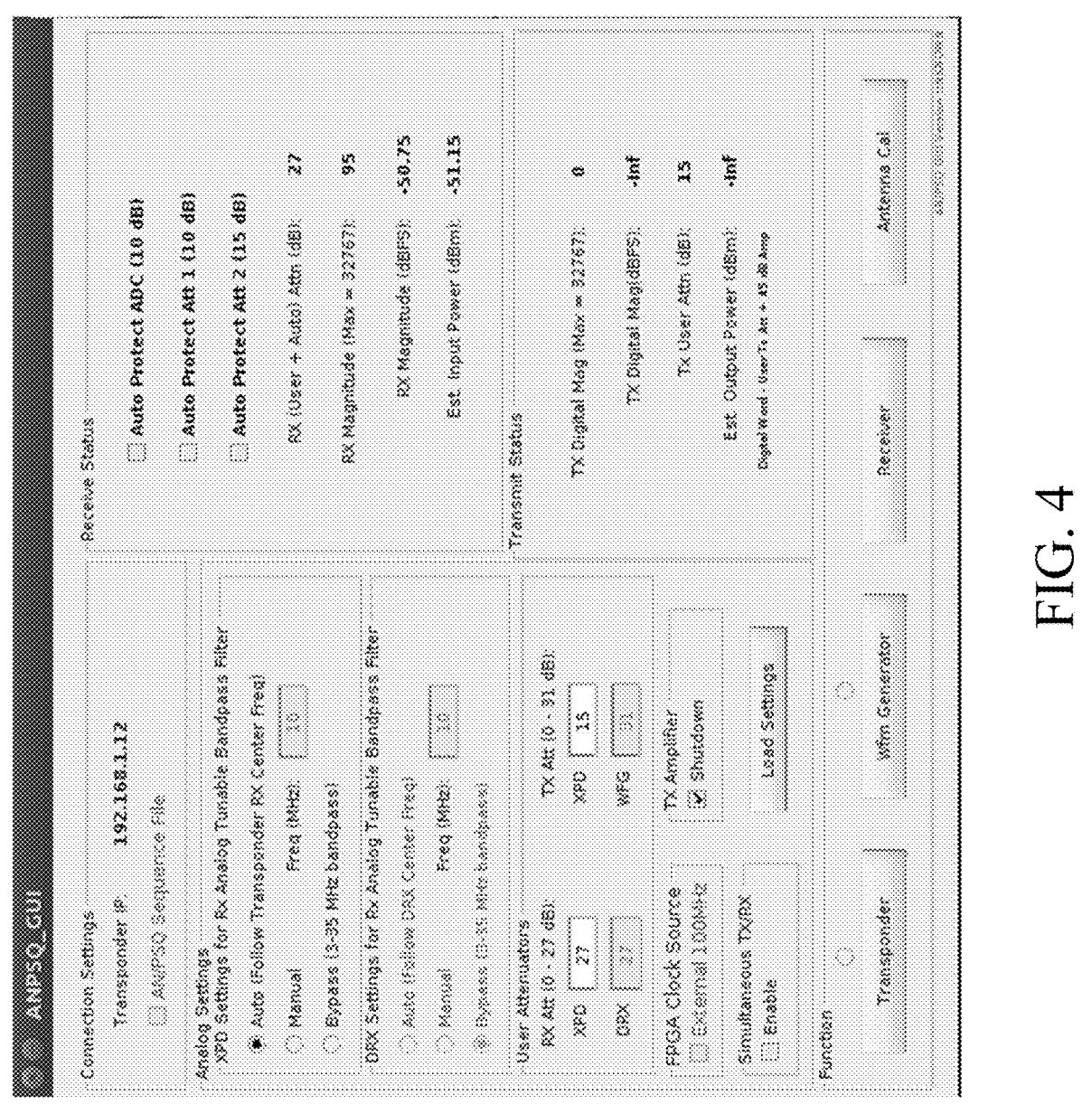
Figure 5:
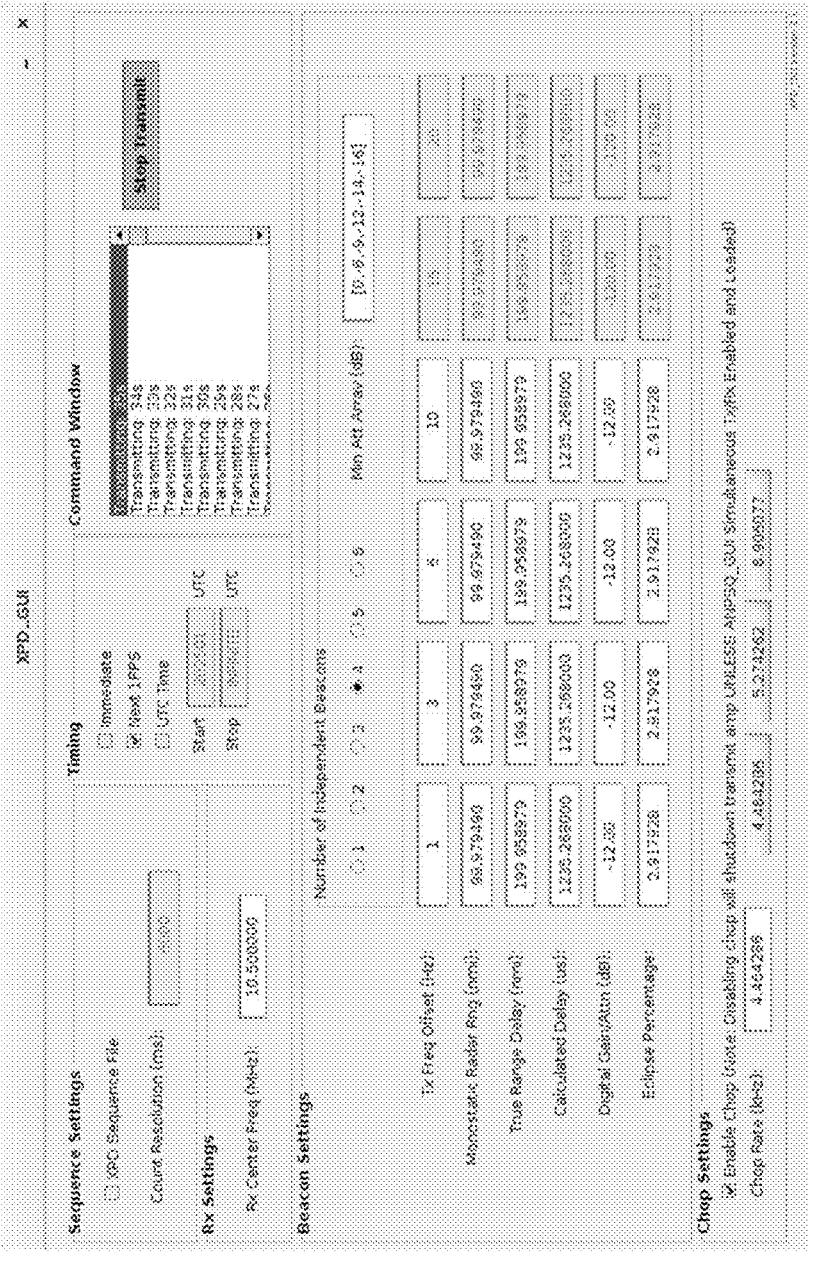
FIG. 5 is a diagram of another exemplary GUI showing exemplary using settings for transponding mode in accordance with an embodiment of the present disclosure.
Figure 6:
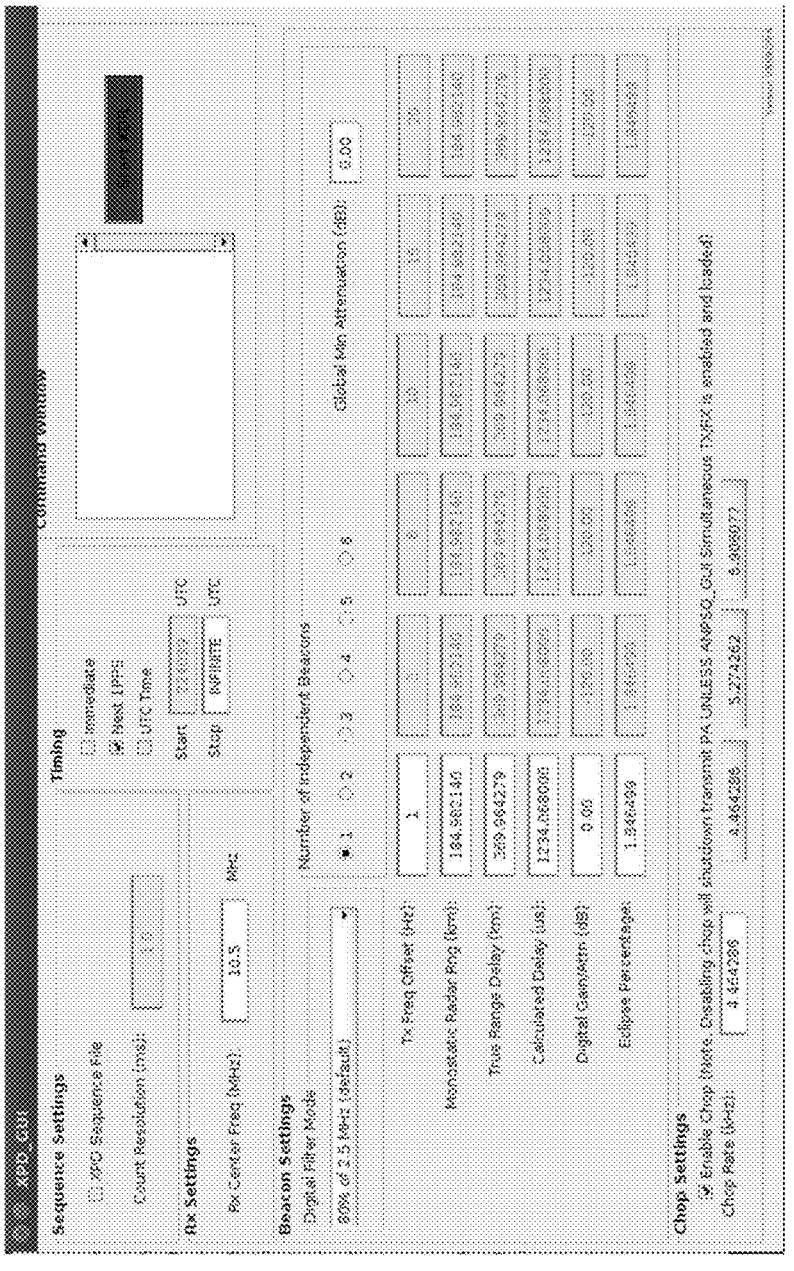
FIG. 6 is a diagram of another exemplary GUI showing exemplary using settings in accordance with an embodiment of the present disclosure.
Figure 7:
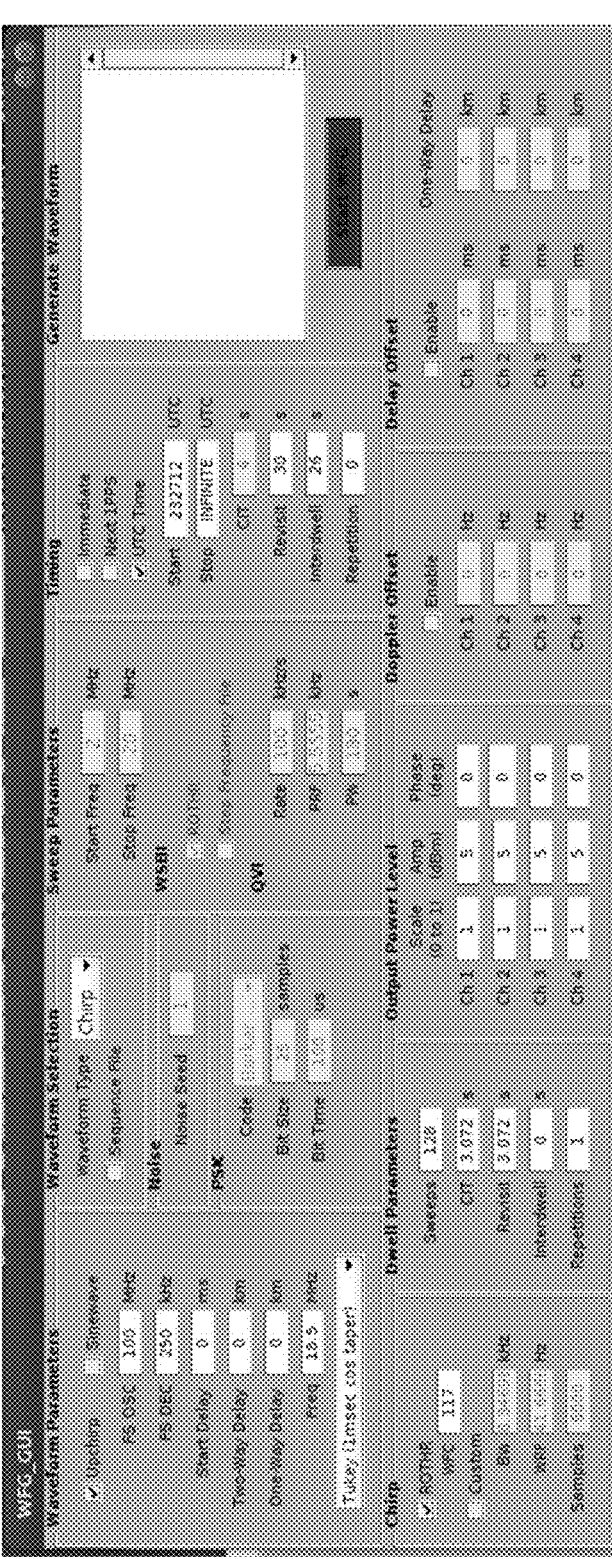
FIG. 7 is a diagram of another exemplary GUI for waveform generation in accordance with an embodiment of the present disclosure.
Figure 8:
FIG. 8 is a diagram of another exemplary GUI for receiver functionality in accordance with an embodiment of the present disclosure.

FIG. 3 is a diagram of an exemplary main graphical user interface (GUI) in accordance with an embodiment of the present disclosure. FIG. 4 is a diagram of another exemplary main GUI in accordance with an embodiment of the present disclosure. FIG. 5 is a diagram of another exemplary GUI showing exemplary using settings for transponding mode in accordance with an embodiment of the present disclosure. FIG. 6 is a diagram of another exemplary GUI showing exemplary using settings in accordance with an embodiment of the present disclosure. FIG. 7 is a diagram of another exemplary GUI for waveform generation in accordance with an embodiment of the present disclosure. FIG. 8 is a diagram of another exemplary GUI for receiver functionality in accordance with an embodiment of the present disclosure.

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A transponder, comprising:

an antenna port;

a coupler coupled to the antenna port;

an antenna diagnostic module coupled to the coupler;

a first switch coupled to the coupler, wherein the first switch is configured to couple the coupler to a receive (RX) module or a transmit (TX) module; and a field-programmable gate array (FPGA) coupled to:

a first analog to digital converter (ADC), wherein an input of the first ADC is coupled to the antenna diagnostic module, a second ADC, wherein an input of the second ADC is coupled to a second switch, and wherein the second switch is configured to couple the second ADC to the RX module or the antenna diagnostic module, and a digital to analog converter (DAC), wherein an output of the DAC is coupled to the TX module.

2. The transponder of claim 1, further comprising a Global Positioning System (GPS) module coupled to the FPGA.

3. The transponder of claim 1, wherein the antenna diagnostic module comprises:

a first attenuator coupled to the coupler and to a first limiter;

a second attenuator coupled to the coupler and to a second limiter;

a first low pass filter (LPF) coupled to the first limiter and to the first ADC; and a second low pass filter (LPF) coupled to the first limiter and to the second switch, wherein the second switch is configured to couple the second ADC to the second LPF or to the RX module.

4. The transponder of claim 1, wherein the first switch is coupler to a limiter, wherein the limiter is coupled to a third switch, wherein the third switch is configured to couple the limiter to a first parallel attenuator (PA) or to ground, wherein the first PA is coupled to a high frequency (HF) filter, wherein the HF filter is coupled to a first amplifier, wherein the first amplifier is coupled to a second PA, and wherein the second PA is coupled to the RX module.

5. The transponder of claim 4, wherein the FPGA is further configured to send respective control signals to the first switch, the second switch, the third switch, the first PA, the second PA, the HF filter.

6. The transponder of claim 4, wherein the RX module comprises:

a test coupler coupled to the second PA and to a test port;

an attenuator coupled to the test coupler; and a second amplifier coupled to the attenuator and to the second switch, wherein the second switch is configured to couple the second ADC to the second amplifier or to the antenna diagnostic module.

7. The transponder of claim 1, wherein the TX module comprises:

a low pass filter (LPF) coupled to the DAC;

a serial attenuator (SA) coupled to the LPF;

a test coupler coupled to the SA and to a test port; and an amplifier coupled to the test coupler and to the first switch, wherein the first switch is configured to couple the coupler to the RX module or to the amplifier.

8. The transponder of claim 7, wherein the FPGA is configured to send respective control signals to the SA and the amplifier.

9. The transponder of claim 1, wherein the FPGA is configured to send respective control signals to the first ADC, the second ADC, and the DAC.

10. A transponder, comprising:

an antenna port;

a coupler coupled to the antenna port;

an antenna diagnostic module coupled to the coupler;

a first switch coupled to the coupler, wherein the first switch is configured to couple the coupler to a receive (RX) module or a transmit (TX) module; and a field-programmable gate array (FPGA) coupled to:

a first analog to digital converter (ADC), wherein an input of the first ADC is coupled to the antenna diagnostic module, a second ADC, wherein an input of the second ADC is coupled to a second switch, and wherein the second switch is configured to couple the second ADC to the RX module or the antenna diagnostic module, and a digital to analog converter (DAC), wherein an output of the DAC is coupled to the TX module, wherein the FPGA is configured to send a first control signal to the first switch to change an operating mode of the transponder.

11. The transponder of claim 1, wherein the FPGA is configured to select the operating mode of the transponder from a plurality of operating modes, and wherein the operating modes comprise an antenna diagnostic mode, a transponding mode, a waveform generation mode, and a direct digital receiver mode.

12. The transponder of claim 11, wherein, in response a selection of the antenna diagnostic mode by the FPGA, the FPGA is configured to send the first control signal to the first switch, wherein the first control signal instructs the first switch to couple the coupler to the TX module.

13. The transponder of claim 12, wherein in response a selection of the antenna diagnostic mode by the FPGA, the FPGA is configured to send a second control signal to the second switch, wherein the second control signal instructs the second switch to couple the second ADC to the antenna diagnostic module.

14. The transponder of claim 11, wherein, in response a selection of the transponding mode by the FPGA, the FPGA is configured to send the first control signal to the first switch, wherein the first control signal instructs the first switch to alternate switching between the RX module and the TX module.

15. The transponder of claim 14, wherein the first control signal instructs the first switch to alternate switching between the RX module and the TX module at a rate determined by the FPGA.

16. The transponder of claim 14, wherein in response a selection of the antenna diagnostic mode by the FPGA, the FPGA is configured to send a second control signal to the second switch, wherein the second control signal instructs the second switch to couple the second ADC to the RX module.

17. The transponder of claim 11, wherein, in response a selection of the waveform generation mode by the FPGA, the FPGA is configured to send the first control signal to the first switch, wherein the first control signal instructs the first switch to couple the coupler to the TX module.

18. The transponder of claim 11, wherein, in response a selection of the direct digital receiver mode by the FPGA, the FPGA is configured to send the first control signal to the first switch, wherein the first control signal instructs the first switch to couple the coupler to the RX module.

19. The transponder of claim 18, wherein in response a selection of the direct digital receiver mode by the FPGA, the FPGA is configured to send a second control signal to the second switch, wherein the second control signal instructs the second switch to couple the second ADC to the RX module.

20. A transponder, comprising:

an antenna port;

a coupler coupled to the antenna port;

a first switch coupled to the coupler; and a field-programmable gate array (FPGA) coupled to:

a first analog to digital converter (ADC), wherein an input of the first ADC is coupled to the coupler, a second ADC, wherein an input of the second ADC is coupled to a second switch, and wherein the second switch is configured to couple the second ADC to the first switch or to the coupler, and a digital to analog converter (DAC), wherein an output of the DAC is coupled to the first switch, wherein the FPGA is configured to send respective control signals to the first switch and the second switch.

* * * * *